United States Patent [19]

Ash et al.

[11] 4,345,116

[45] Aug. 17, 1982

[54] DYNAMIC, NON-HIERARCHICAL ARRANGEMENT FOR ROUTING TRAFFIC

[75] Inventors: Gerald R. Ash, West Long Branch, N.J.; Richard H. Cardwell, North Andover, Mass.

[73] Assignee: Bell Telephone Laboratories, Incorporated, Murray Hill, N.J.

[21] Appl. No.: 221,971

[22] Filed: Dec. 31, 1980

[51] Int. Cl.³ .............................................. H04M 7/00
[52] U.S. Cl. ............................................... 179/18 EA
[58] Field of Search .................................... 179/18 EA

[56] References Cited

U.S. PATENT DOCUMENTS 3,570,008  3/1971  Downing et al. ................... 364/200
3,624,613  11/1971  Smith et al. ........................ 364/200
3,960,164  9/1975  Philip et al. .................... 179/18 EA

FOREIGN PATENT DOCUMENTS 2027564  2/1980  United Kingdom .......... 179/18 EA

OTHER PUBLICATIONS

"Traffic Engineering Techniques for Determining Trunk Requirements in Alternate Routing Trunk Networks", C. J. Truitt, *Bell System Technical Journal*, vol. 23, No. 2, Mar. 1954, pp. 277-302.
*Bell System Technical Journal*, vol. 43, No. 5, Sep. 1964, Parts 1 and 2 (entire issue).
"DDD Network Optimization in Field Engineering--From Theory to Application", Alfred Lotze, *IEEE Transactions on Communications*, vol. COM-22, No. 12, Dec. 1974, pp. 1921-1931.
"Engineering Traffic Networks for More Than One Busy Hour", M. Eisenberg, *Bell System Technical Journal*, vol. 56, No. 1, Jan. 1977, pp. 1-20.
*Bell System Technical Journal*, vol. 56, No. 7, Sep. 1977 (entire issue).
*Bell System Technical Journal*, vol. 57, No. 2, Feb. 1978 (entire issue).
"Large Scale Communication Networks-Design and Analysis", Fischer et al., *Omega, The International Journal of Management Science*, vol. 6, No. 4, 1978, pp. 331-340.

*Primary Examiner*—Thomas W. Brown
*Attorney, Agent, or Firm*—Richard J. Roddy

[57] ABSTRACT

In a network for routing traffic from an originating node to a terminating node, it is common to provide alternate routes in order to increase the number of route choices between the originating and terminating nodes. The Bell System toll network employs a hierarchical alternate routing arrangement wherein various nodes, or control switching points (CSPs), are rank ordered for defining a process of routing calls through the network, whereby some CSPs are prohibited from routing traffic through other CSPs. Hence, known hierarchical alternate routing arrangements tend to inhibit route choices, which tends toward longer, and hence more costly, routes. Such problems tend to arise from the limited capability of electromechanical switching equipment. But with the increasing use of electronic stored program controlled CSPs, they can be solved with our alternate routing method which allows route choices without regard to network hierarchy. A plurality of routing sequences is generated, each route sequence including a plurality of route choices and being time sensitive to traffic demands, subject to a grade of service constraint and used for some predetermined time interval during which the sequence tends to mitigate network cost. An appropriate routing sequence is selected and in response thereto a signal is generated to identify a route choice. The route choice signal is then extended, perhaps on a call-by-call basis, to a node which is intermediate to the originating and terminating nodes for identifying the route to be followed in completing the call. In the event a link on the route choice is unavailable, a crankback signal is returned to the originating node. Responsive to the crankback signal, a second route choice from the routing sequence may be attempted from the originating node. This flexible, time sensitive arrangement tends toward increasing the number of route choices and toward mitigating or reducing route length and hence route cost.

7 Claims, 6 Drawing Figures

| COLUMN | 1 | 2 | 3 | 4 | 5 | 6 | 7 | 8 |
|---|---|---|---|---|---|---|---|---|
| | ROUTE NUMBER | ROUTE BLOCKING | DESIRED CARRIED TRAFFIC | DESIRED OFFERED TRAFFIC | REALIZED OFFERED TRAFFIC | REALIZED CARRIED TRAFFIC | UPPER BOUND ON CARRIED TRAFFIC | VIOLATION |
| | 1 | .307 | 9.75 | 14.07 | 14.07 | 9.75 | 9.75 | 0 |
| | 7 | .603 | 1.36 | 3.43 | 3.43 | 1.36 | 1.72 | 0 |
| | 5 | .287 | 1.88 | 2.64 | 2.64 | 1.88 | 2.11 | 0 |
| | 4 | .453 | 1.06 | 1.94 | 1.08 | 0.59 | 0.59 | 0.47 |
| | 2 | .239 | 0.012 | 0.016 | 0.016 | 0.012 | 0.37 | 0 |
| | 3 | .309 | 0 | 0 | 0.48 | 0 | 0.33 | 0 |
| | 6 | .339 | 0 | 0 | 0.48 | 0 | 0.32 | 0 |
| | 8 | .488 | 0 | 0 | 0.48 | 0 | 0.25 | 0 |

DYNAMIC, NON-HIERARCHICAL ARRANGEMENT FOR ROUTING TRAFFIC

TECHNICAL FIELD

This invention relates to an arrangement for routing traffic and, more particularly, to a dynamic, non-hierarchical alternate routing arrangement.

BACKGROUND OF THE INVENTION

In a system for routing traffic such as in a telecommunications system for routing a call in order to interconnect a calling party with a called party, it occasionally happens that the traffic, for example the call, is blocked. Reasons for blocking include an absence of available interconnecting equipment, for example, stemming from an all servers, or all trunks, busy condition. To mitigate the blocking of traffic, the system may provide alternate routes between the originating node and the terminating node, e.g., between the parties. Indeed, alternate routing has come to be a technique long used for improving the efficiency and reliability of a telecommunications system. Notwithstanding, problems arise, for example, as to locating the alternate routes or as to sizing the alternate routes or as to controlling the flow of the traffic through the alternate routes.

Solutions to such problems have led to the hierarchical network structure employed by the Bell System. There, a toll network switching plan, which contemplates a hierarchical ranking of switching centers, is employed. (These centers may be thought of as nodes in a network but are also called control switching points (CSPs) in the art.) The highest ranking center is a regional center followed in decreasing rank order by a sectional center, by a primary center, and by a toll center. Each regional center (RC) has one or more sectional centers homing on it. Each sectional center (SC) homes on an RC and may have one or more primary centers homing on it. Each primary center (PC) homes on an RC or SC and has one or more toll centers homing on it. Each toll center (TC) is so called because it merely serves as a connecting point between the toll network and the local central office. Thus, each switching center is commonly classified with respect to a geographical area served: the local central office serving a geographical neighborhood; the TC serving a group of local offices, the PC serving a group of TCs, the SC serving a group of PCs, and lastly the RC serving a group of SCs. Clearly, under this hierarchical plan any center could home on another center of higher rank if so dictated by geographic and economic considerations. Just as clearly under the hierarchical plan, a center could not home on another center of lower rank.

Homing, which is one method for routing calls among the switching centers, is typically accomplished by a group of trunks interconnecting the centers. (That is, the nodes are interconnected by links, each link comprising a group of servers which, in the telecommunications art, are called trunks.) If an alternate route is provided between two centers, the interconnecting trunk group is usually referred to as a "high usage" trunk group. If an alternate route is not provided, e.g., one CSP homes on another CSP, the interconnecting trunk group is usually referred to as a "final" trunk group. Hierarchical alternate routing depends on such high usage and final trunk groups. Destruction of certain of these trunk groups, in particular destruction of a final trunk group, may cause substantial degradation of service. Thus, some problems exist with known alternate routing methods.

As to another problem, hierarchical alternate routing may involve routing traffic through a plurality of nodes. Unfortunately, the cost of routing is approximately proportional to the distance of the routing. Hence, as the length of the alternate route begins to grow, the cost of hierarchical alternate routing begins to grow.

As to still another problem, traffic offered between two centers is usually employed in determining the number of trunks on the trunk group between the centers. See, for example, C. J. Truitt, "Traffic Engineering Techniques for Determining Trunk Requirements in Alternate Routing Trunk Networks", *The Bell System Technical Journal*, Vol. 33, No. 2 (March 1954), pp. 277–302. Thusly, according to one theory commonly known as the Erlang B, or the blocked calls cleared, theory, the probability $B(N,A)$ that a call offered to a link will be blocked is determinable by solving the following equation:

$$B(N,A) = \frac{\frac{A^N}{N!}}{\sum_{i=0}^{N} \frac{A^i}{i!}} \tag{1}$$

where A is the traffic offered between the centers, N is the number of trunks comprising the link between the centers, and the symbol ! means factorial. Commonly, for each trunk group, some of the offered traffic is carried and some is blocked. The blocked traffic may overflow and, in turn, may be offered to an alternate route. For example, the traffic carried $A_c$ by a trunk group of link size N trunks is determinable by solving the following equation:

$$A_c = A \times [1 - B(N,A)] \tag{2}$$

whereas the overflow traffic $A_o$ available to be alternate routed is determinable by solving the following equation:

$$A_o = A \times B(N,A). \tag{3}$$

Notwithstanding, the traffic offered between centers usually varies, inter alia, according to the time of day, according to the day of the week, and according to the week of the year. As a result of this variability, the traffic offered to one trunk group may exhibit a peak load at one time of the day whereas the traffic offered to another trunk group may exhibit a peak load at a different time of the day. Clearly, therefore, a non-coincidence of peak loads among different trunk groups is common. Unfortunately, in determining the number of trunks in a trunk group, the non-coincident peaks are not usually taken into account. Rather, it is common to size the trunk groups using estimates of the traffic offered during the busy-hour, busy-season of the year. Hence more trunks may exist with hierarchical alternate routing than may be needed with an alternate routing technique that took into account the non-coincident peak loads.

SUMMARY OF THE INVENTION

These and other problems are solved with our method of routing traffic through a network without regard to network hierarchy. Our method controls the generating of a plurality of routing sequences in response to traffic demands and the subject to a grade of service constraint. Each routing sequence includes a plurality of route choices between an originating node, or CSP, and a terminating node, each route choice being without regard to network hierarchy. One routing sequence is selected and extended, for example by being transmitted, to an originating node. The selected sequence is one which is time sensitive and which tends to mitigate network cost. That is, the selected sequence if sensitive to traffic demands for a time interval during which the routing sequence is to be used. A signaling message is generated at the originating node and extended perhaps over a Common Channel Interoffice Signaling (CCIS) system to an intermediate node of a first route choice for identifying the route choice, e.g., for identifying the terminating node to which the intermediate node should forward the traffic. In the event a link on a route is blocked, a crankback signal is transmitted to the originating node responsive to which a second route choice is selected. Thereby, our method is a time sensitive alternate routing method, which generates and selects alternate routes without regard to network hierarchy and which obtains network economies and efficiencies heretofore absent with known routing arrangements.

BRIEF DESCRIPTION OF THE DRAWING

Our invention should become more apparent from the following detailed description when taken in conjunction with the accompanying drawing in which.

DETAILED DESCRIPTION

Figure 1:
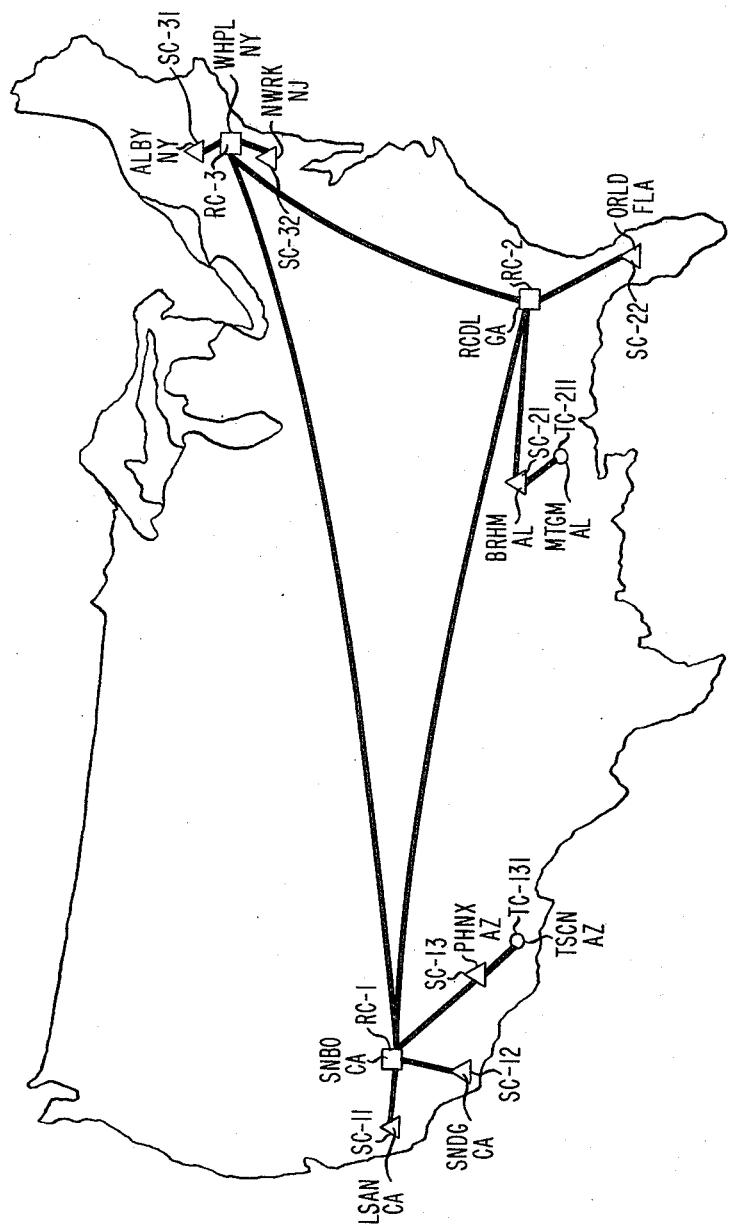
FIG. 1 depicts the geographical extent of an illustrative network, which is useful in describing the principles of our invention.

In FIG. 1, various rectangular shaped regional centers RC-1 through RC-3, triangular shaped sectional centers SC-11 through SC-32, and circular shaped toll centers TC-131 through TC-211 are geographically depicted to illustrate a manner in which the processing of a call originated from a calling party located in San Diego, Calif. (SNDG, CA) to a called party in Birmingham, Ala. (BRHM, AL) may be hampered by hierarchical alternate routing. For example, a hierarchical alternate route may include a path from sectional center SC-12 in San Diego through both regional center RC-1 in San Bernadino, Calif. (SNBO, CA) and regional center RC-2 in Rockdale, Ga. (RCDL, GA) to sectional center SC-21 in Birmingham. On the other hand, less hampering and more economies and efficiencies may obtain if a non-hierarchical alternate route were possible. In accord with the principles of our invention, such a non-hierarchical alternate route is possible. For example, a non-hierarchical alternate route may include a shorter and more economical path from sectional center SC-12 downward in the hierarchy through toll center TC-131 in Tucson, Ariz. (TSCN, AZ) to sectional center SC-21.

To set the stage for a better understanding of the principles of our invention, it is well known that the telephone of a calling party may be connected to a local central office (not shown). The local central office may comprise an electronic stored program controlled (SPC) office such as the No. 1 Electronic Switching System (ESS) disclosed in the two part publication of *The Bell System Technical Journal,* Vol. 43, No. 5, (September 1964), pp. 1831–2609 and in U.S. Pat. No. 3,570,008 issued Mar. 9, 1971. The local central office may in turn be connected to a control switching point. Each control switching point (CSP) may itself comprise an electronic stored program controlled office such as the No. 4 ESS disclosed in the publication of *The Bell System Technical Journal,* Vol. 56, No. 7, (September 1977), pp. 1015–1336. Signaling among the offices may be provided by a Common Channel Interoffice Signaling (CCIS) system such as the CCIS system disclosed in the aforecited No. 4 ESS publication and, more particularly, in the publication of *The Bell System Technical Journal,* Vol. 57, No. 2, (February 1978), pp. 221–447 as well as in U.S. Pat. No. 3,624,613 issued Nov. 30, 1971. Thusly, the aforecited references may be consulted for a detailed understanding of local central offices, control switching points, and their structural interconnection as well as the signaling among same. In any event, such arrangements are in public use and, as will shortly be described, such arrangements may be modified for embodying the principles of our invention.

In describing an illustrative embodiment, we assume each alternate route will include at most two links. Clearly, alternate routes are not limited to at most two links. Rather, we assume one or two link alternate routes for brevity and to aid in the description of our illustrative embodiment. Continuing, a call can be alternate routed from an originating node, or control switching point (CSP), over a first link to an intermediate node, or CSP, and thence over a second link to a terminating node, or CSP. Just as readily, a call can be alternate routed over a direct route between originating CSP and terminating CSP. For example, referring to FIGS. 2 and 3, a call from San Diego to Birmingham may, according to routing sequence number 1, traverse a first route choice labelled ① directly on the single link from SC-12 to SC-21. In the event the first choice direct route were blocked, the call may be alternate routed. For example, routing sequence number 1 may include as a second route choice the two-link alternate route labelled ② from San Diego SC-12 through the intermediate CSP at Phoenix SC-13 to Birmingham SC-21. In similar fashion, a third route choice may be the alternate route labelled ③ from San Diego SC-12 downward in the hierarchy through Tucson toll center TC-131 to Birmingham SC-21 while a fourth route choice may be the alternate route labelled ④ from San Diego SC-12 through Montgomery TC-211 to Birmingham SC-21. While each of the three illustrative alternate routes is a two link route, it may be that an alternate route is the direct link. See, for example, the third route choice labelled ① of routing sequence number 4. Also, although not shown, traffic between San Diego and any ated for each pair of CSPs and, thereafter, the dynamic routing sequence may be extended to the respective CSPs over the CCIS system for use by the CSPs at a predetermined time interval. For example, a plurality of routing sequences, each sequence for a different predetermined time interval, may be extended to a CSP in advance of a need of its use. In turn, the CSP may be suitably programmed to use the different routing sequences either according to a predetermined time schedule or on a call-by-call basis. Continuing, and as aforementioned, for each route choice of a routing sequence, each CSP is also suitably programmed to formulate a second CCIS signaling message, which is sent to the intermediate CSP, for identifying the terminating CSP on a two-link alternate route. (More generally, the second CCIS message identifies each link on a multi-link alternate route.) An intermediate CSP may crankback the first CCIS signal to the originating CSP when a next link is detected as unavailable, e.g., forwarding of the call is blocked, responsive to which the originating CSP sends a third CCIS signaling message for identifying the terminating CSP to an intermediate CSP of a second route choice, et cetera. Thereby, we obtain our improved dynamic, non-hierarchical alternate routing arrangement for establishing alternate route sequences responsive to variations in the traffic demands placed upon the various links of the network, which sequences may be used at predetermined times thusly being time sensitive and taking into account such variations as non-coincident peak loads.

Figure 4:
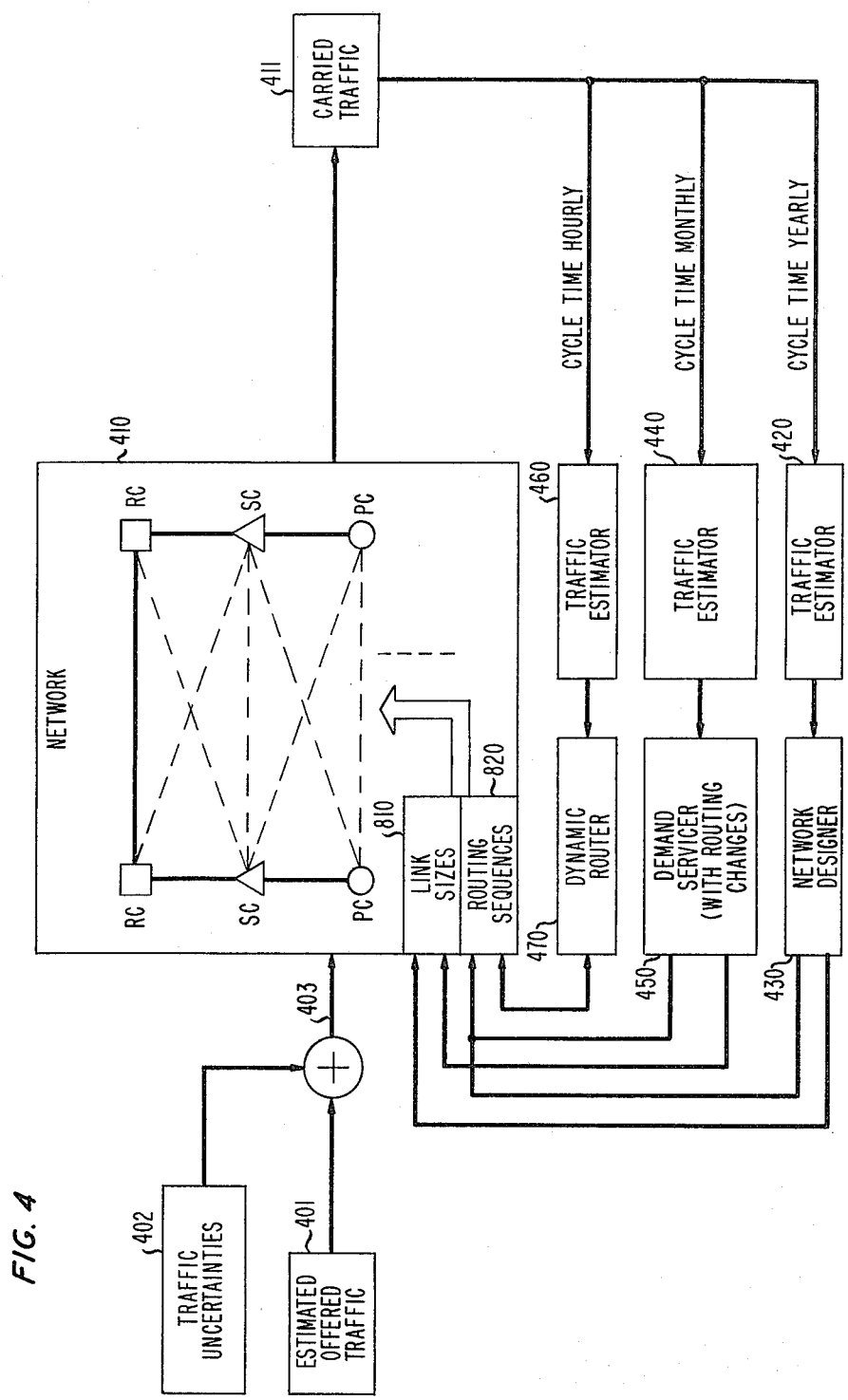
FIG. 4 illustrates an arrangement for generating a routing sequence in accord with the principles of our invention.
Figure 5:
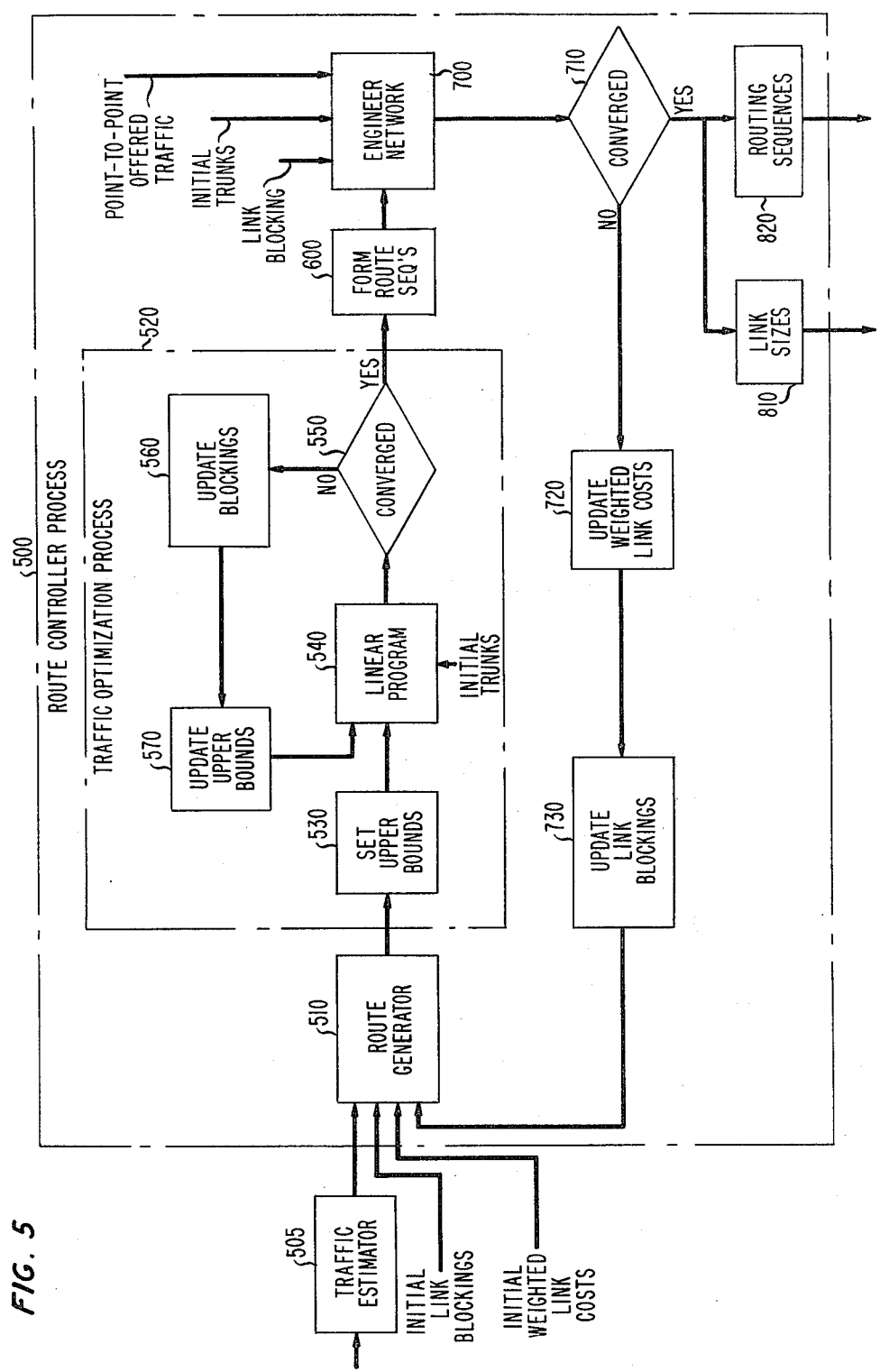
FIG. 5 illustrates an arrangement, which may be used in the FIG. 4 arrangement, for controlling the generation of a cost mitigating, non-hierarchical network routing sequence in accord with the principles of our invention, and FIG. 6 recites an example useful in explaining the arrangement of FIG. 5.

Still more particularly, referring to FIG. 5, traffic estimator 505, responsive to carried traffic 411, extends estimates of offered traffic to route controller process 500. With reference to FIGS. 4 and 5 estimator 505 is substantially similar to and included in each of traffic estimators 420, 440 and 460. The respective estimators differ as to the time interval over which their respective estimates are provided. Further, route controller process 500 is substantially similar to and included in each of network designer 430 and demand servicer 450 for providing link sizes and routing sequences as well as in dynamic router 470 for providing time sensitive routing sequences. The respective steps 430, 450, and 470 each provide routing sequences but differ as to an initialized network and as to adjustments permitted thereto. For example, process 500, when included in network designer 430, provides both for installing and for disconnecting trunks on the respective links of an existing network. As mentioned, the process including designer 430 is commonly carried out on an annual basis and may be fine tuned by demand servicer 450 to obtain the existing initialized network, which network 410 may be processed by designer 430 for a next year. Also, for example, process 500, when included in demand servicer 450, provides for installing trunks but may or may not provide for disconnecting trunks on the respective links of the network 410 to be fine tuned. Still also, for example, process 500, when included in dynamic router 470, provides for neither installing nor disconnecting trunks. Controller process 500, in turn, includes the process 510 of generating a plurality of routes between various CSPs in network 410. For example, for each pair of originating CSP and terminating CSP, route generator 510 selects a predetermined number, e.g., "K" of the shortest distance routes between the pair of CSPs. Of course, the number of routes K between a pair of CSPs need not be the same for all pairs of CSPs. The K routes for a pair of CSPs are rank ordered according to relative cost for obtaining a proposed routing sequence between the CSPs. That is, as hereinafter described, each link k has associated therewith a weighted link cost $W_k$. The K shortest distance routes may be the K smallest weighted link cost routes between the pair of CSPs. Hence, the process first selects routes that a call might take. The next step, i.e., traffic optimization process 520, involves linear program 540 which assigns traffic to the candidate routes to mitigate cost. However, in mitigating cost, another problem arises.

As to that other problem, the traffic carried on a particular route depends upon the blocking on the route as well as upon the traffic assigned to all other routes comprising a particular routing sequence. For instance, if the blocking on a route were 20 percent and the offered load were 100 erlangs, it would be impossible to carry more than 80 erlangs on the route. Hence, a process for determining the upper bound on carried traffic for each route is desirable so that the routes selected by linear program 540 are feasible. Iterative optimization process 520 for utilizing upper bounds to force traffic feasibility is also schematically illustrated in FIG. 5. Thusly, after the routes are generated, initial upper bounds 530 on carried traffic are set for use by a first iteration of linear program 540. At the first iteration, the optimal traffic carried on a route is unknown. Hence, the initial upper bound 530 on traffic carried on each route is set according to the aforedescribed equation (2). Unfortunately, and as an aside, the resulting carried traffic may not be mathematically feasible since there may not be sufficient traffic offered to simultaneously achieve the desired carried traffic on all routes. For instance, suppose there is a routing sequence having three route choices, $i=1, 2$ and 3, between an originating-terminating CSP pair and the blocking $B_i$ on route choice i is:

$$B_1 = 0.2$$

$$B_2 = 0.1$$

$$B_3 = 0.2$$

The initial values of blocking $B_i$ are extended from and through an input of route generator 510 to process 520. As controller process 500 iterates, the values of blocking $B_i$ are updated and extended from update link blocking 730, as hereinafter described, also through generator 510 to process 520. The respective routes responsive to a point-to-point offered load A of 10 erlangs could from equation (2) theoretically carry the following traffic $A_{ci}$:

$$A_{c1} = 8 \text{ erlangs}$$

$$A_{c2} = 9 \text{ erlangs}$$

$$A_{c3} = 8 \text{ erlangs}$$

Figures 2, 3:
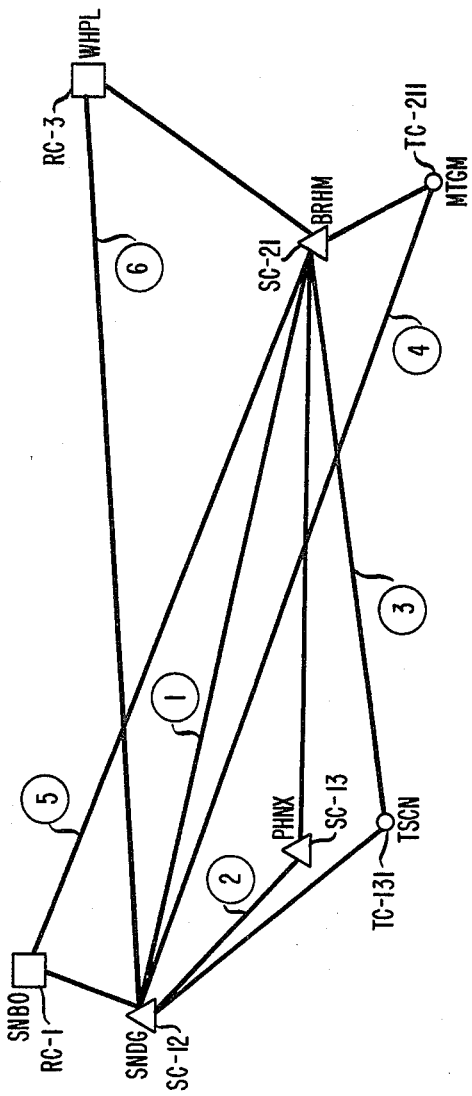
FIG. 2 illustrates a subset of the network in FIG. 1 for explaining a non-hierarchical network.
FIG. 3 when taken in conjunction with FIG. 2 illustrates some dynamic, non-hierarchical alternate routing sequences which are useful for understanding the principles of our invention.

Now assume that the grade-of-service constraint between the pair of originating and terminating CSPs is 0.005. Therefore, the total traffic carried on all three routes should total 9.95 erlangs. This total carried traffic is feasible with the assumed routing sequence since the overall point-to-point blocking is $B_1 B_2 B_3 = 0.004$, which is less than the grade of service constraint. Now suppose that linear program (LP) 540 assigns an optimal cost mitigating carried traffic $A_{ci}^*$ as other CSP could use different intermediate nodes than as shown in FIGS. 2 and 3. Thusly, it is clear that our non-hierarchical alternate routing arrangement routes traffic without regard to network hierarchy.

In addition to the aforedescribed, according to a real-time, traffic sensitive aspect of our routing method, additional real-time routes may be used for completion of calls that overflow the preplanned routing sequence. The method uses a trunk reservation step to protect preplanned traffic on the links making up the real-time routes. Calls overflowing the preplanned route may be offered sequentially to real-time routes such as routes ⑤ and ⑥ in FIG. 2. Connection via these routes would be subject to trunk reservation restrictions. For example, trunk reservation restrictions could require that a prespecified number of trunks (i.e., a "reservation level") be free on each real-time route before a connection is allowed. The use of reservation restrictions provides protection to the preplanned traffic normally expected to use the real-time routes.

In our illustrative embodiment, each intermediate CSP included in a route choice of a routing sequence may be suitably programmed to transmit a first CCIS signal, hereinafter called a crankback signal, over the CCIS facilities interconnecting the CSPs for informing the originating CSP that the second link of a multi-link route is blocked. For example, a single bit crankback signal could be employed meaning the route is blocked. Of course, a first route choice of a routing sequence could itself be a multi-link route using a crankback signal. In any event, responsive to such a crankback signal, the originating CSP, in following a particular routing sequence, may either select an alternate route or abandon the call, i.e., treat the call as blocked. Thusly, each originating CSP may be suitably programmed to maintain control over a call until the call is received for processing at the terminating CSP or until the call is abandoned, i.e., blocked.

Toward generating the routing sequences, studies have shown that peak loads may occur in the morning, in the afternoon, or in the evening. Studies have also shown that weekend traffic may still have different peak loads than does weekday traffic. Thusly, and as aforementioned, traffic demands tend to be dynamic, or time-sensitive. To emphasize a time-sensitive aspect of our alternate routing arrangement, illustrative routing sequence 1 in FIG. 3 may be used during a first predetermined time interval representing a weekday morning. As traffic demands shift, routing sequence 2 may be used during a second predetermined interval representing a weekday afternoon. In similar fashion, routing sequence number 3 or routing sequence number 4 may be used during still different predetermined time intervals. Of course, the predetermined time intervals could be other than as just described. For example, the intervals could be hourly. Accordingly, and in accord with the principles of our invention, the routing sequence used at any time of a day is responsive to the traffic demands at that time. Therefore, our routing sequence is time sensitive, or dynamic. Thusly, our dynamic, non-hierarchical alternate routing arrangement generates a routing sequence for use at a predetermined time of a day, which sequence also mitigates network cost and is responsive to non-coincident traffic demands.

More particularly, it is known that a toll network may be designed using a process such as is disclosed in the aforecited Truitt publication and/or a publication of M. Eisenberg entitled "Engineering Traffic Network for More Than One Busy Hour", *The Bell System Technical Journal*, Vol. 56, No. 1, (January 1977) pp. 1–20. Referring to our FIG. 4, we schematically include and review a process used in network design. For example, traffic 403, which is offered to network 410, usually includes an estimate 401 of traffic offered between the various pairs of CSPs of network 410. Offered traffic 403, which is also called the point-to-point offered load in the art, also includes traffic uncertainties 402, which in turn include estimation errors and daily variations. The network design process thereafter determines an interconnection pattern among the plurality of CSPs as well as determines the number of trunks therebetween for economically and efficiently carrying offered traffic 403 subject to a prefixed grade of service constraint, the constraint usually being some design probability of a call being blocked. Thusly, although it is known to design network 410 for carrying some forecasted offered traffic, it may be that, under actual conditions, the network may actually carry some other offered traffic. The resultant carried traffic 411 is commonly used by estimator 420 for estimating future offered traffic and by network designer 430 to rederive link sizes. i.e., the number of trunks in each trunk group, to achieve the prefixed grade of service. On the one hand, such a process is commonly carried out on a long term, perhaps annual, basis for reducing the cost of a hierarchical network design. The long term basis allows for practical delays attendant to the adjustment of the capacity of a large network such as the Bell System toll network, e.g., installing or disconnecting trunks. On the other hand, once the capacity has been adjusted, it may be desirable to fine tune the link sizes on a shorter term, perhaps on a weekly or monthly basis, to reflect changes in traffic demands such as may be reflected in estimation errors. Here, traffic estimator 440 and demand servicer 450 may be used for fine tuning the link sizes and for providing routing sequences within the network to account for such variations as estimation errors in traffic demands. Thusly, longer term, e.g., annual, adjustment allows a reasonable time for the practical expansion of network capacity, whereas shorter term, e.g., monthly, adjustment offers some fine tuning thereof.

Viewed differently, FIG. 4 includes a process for network design in accordance with the principles of our invention. In accord with our dynamic, non-hierarchical alternate routing method, traffic estimator 420, network designer 430, traffic estimator 440, and demand servicer 450 may parallel the aforedescribed approach in providing link sizes and routing sequences except, as will shortly be made clear, in so far as each now permits a cost mitigating non-hierarchical network for attaining economies and efficiencies through dynamic, non-hierarchical alternate routing. In addition to the above, an embodiment of our arrangement includes traffic estimator 460 and dynamic router 470 for providing more frequent, time-sensitive adjustment to the routing sequences. That is, in our illustrative embodiment, link sizes and/or routing sequences may be adjusted under control of network designer 430 and demand servicer 450 while time sensitive routing sequences may be adjusted under control of dynamic router 470. Further, the process of controlling the generation of the routing sequences for our arrangement may occur either in a CSP or in auxiliary data processing equipment separate and apart from a CSP or in a combination thereof. Indeed, a time sensitive routing sequence may be gener- $A_{c1}^* = 8$ erlangs $A_{c2}^* = 1.95$ erlangs $A_{c3}^* = 0$ From the above, the optimal cost mitigating traffic of 8 erlangs is feasible for being carried on route choice 1 responsive to offering route 1 the entire 10 erlangs. This obtains because $B_1 = 0.2$ and $A = 10$ erlangs. As a result, 2 erlangs will overflow route 1 to be offered to route 2. However, inasmuch as $B_2 = 0.1$, the maximum carried traffic on route 2 is 1.8 erlangs. Hence, the cost mitigating carried traffic $A_{c2}^*$ of 1.95 erlangs on route 2 is not feasible. Our soon to be described traffic optimization process 520 also mitigates such a problem.

Continuing, and according to the principles of our invention, a cost mitigating network without regard to hierarchy is obtained. As a first point and as priorly described, the cost of routing traffic is approximately proportional to the distance of the routing. That is, the cost per trunk on link 'k', which link interconnects two CSPs of known distance, may be a value $C_k$. As a second point, referring to the aforecited equation (1), it is well known that, for constant blocking, the number of extra trunks to carry an increase in offered traffic decreases as size of the trunk group increases, i.e., the mathematical partial derivative of equation (1), i.e., $\partial N/\partial A$, is a decreasing function for increasing A. This relationship leads to the conclusion that one large trunk group is more efficient than several small trunk groups. In light of the first and second points, the partial derivative of the product of the cost per trunk times the number of trunks, i.e., $C_k N_k$, with respect to carried traffic $A_{ck}$ may be a weighted link cost $W_k$ corresponding to the marginal, or incremental, cost per unit of carried traffic, i.e., with cost being constant:

$$W_k = \partial(C_k N_k)/\partial A_{ck} = C_k \partial N_k/\partial A_{ck} \quad (4)$$

Hence, linear program 540 may be any of the standard commercially available liner programming routines such as the IBM MPSX-370 linear program for deriving the carried traffic $A_{ck}^*$ on each link k in the network to minimize a total network weighted, traffic carrying i.e., $$\text{Minimize} \sum_k W_k A_{ck} \quad (5)$$

subject to constraints related to an upper bound of carried traffic on each route and point-to-point grade of service. An example including these constraints is hereinafter described. Thus, the required cost mitigating carried traffic $A_{ck}^*$ is derived so as to meet the grade-of-service constraint. If the grade-of-service constraint cannot be met, the routes are assigned their maximum carried traffic so as to minimize the blocking and hence approach the grade of service constraint. Alternatively, the grade of service constraint may be met by installing trunks on the least expensive route, e.g., a route having a low $W_k$, during a hereinafter described engineering network step 700.

Assuming traffic optimization process 520 has not yet converged 550, i.e., a feasible, cost mitigating network has not yet resulted, the next step as shown in FIG. 5 is updating 560 of the link blockings based on the then derived optimal link traffic. Updating 560 can be done by calculating the link size so that the maximum allowed blocking in any of the predetermined time intervals is not exceeded. Thereafter, updating 560 calculates the blocking in all the predetermined time intervals. After the blockings have been updated, the next step is updating 570 of the upper bounds by calculating same based on the currently derived optimal link traffic for obtaining a feasible solution.

Figure 6:
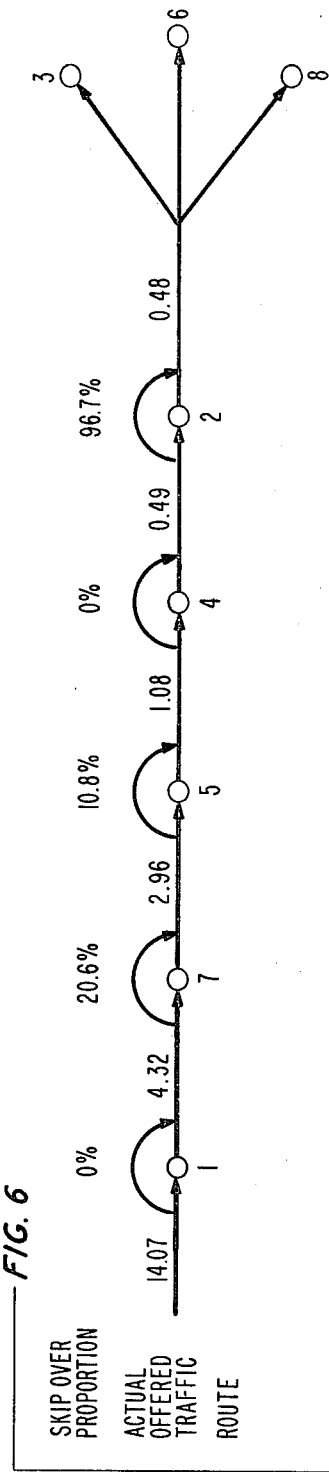

Upper bound updating method 570 can be illustrated by the example shown in FIG. 6. Assume the cost mitigating carried traffic derived by LP 540 using the initially set upper bounds 530 is for routing 14.07 erlangs of point-to-point offered load between a particular pair of CSPs during a predetermined time interval. Updating step 570 includes calculating the desired traffic (column 4) which should be offered to each route to realize the carried traffic (column 3), which carried traffic was assigned to the link(s) of the route by LP 540 for mitigating network cost. The offered traffic can be calculated using equation (2), i.e., for each route (column 1) selected by the LP 540, the desired offered traffic (column 4) is obtained from the desired carried traffic (column 3) divided by one minus the route blocking (column 2). The next step includes sorting desired offered traffic (column 4) from largest to smallest. This is already done in the example in FIG. 6. Note, for example, that route number 7 desired offered traffic is less than and hence is sorted to follow route number 1 desired offered traffic. Route numbers used in this example refer to a particular route choice between the particular pair of CSPs. Indeed, after convergence 550, a route sequence forming step 600 could form the routing sequence (1, 7, 5, 4, 2, 3, 6, 8) for the particular pair of CSPs during the predetermined time interval. Continuing, once the route ordering has been determined, process 520 proceeds as follows. Inasmuch as the largest desired offered traffic is equal, in this example, to the actual offered traffic, i.e., 14.07 erlangs, all traffic is offered to route 1 (column 5). Hence, none of the offered traffic is "skipped over" route 1. Offering the traffic to route 1 in this way will realize (column 6) the desired carried traffic (column 3). With a route 1 blocking of 0.307, the overflow from route 1 is 4.32 erlangs. Thus, the offered (column 4) and carried (column 3) traffic desired on route 1 can be realized as shown respectively in columns 5 and 6. Since the total traffic is offered to route 1 and the blocking is assumed constant, the upper bound (column 7) of carried traffic on route 1 flow remains at 9.75 erlangs.

Column 8 gives the "violation", or amount by which the desired traffic (column 3) exceeds the updated upper bound (column 7). If column 3 does not exceed the value in column 7, e.g., in the case of route number 5, the violation is zero.

Now consider route 7. The desired offered traffic (column 4) to route 7 is 3.43 erlangs which is less than the overflow of 4.32 erlangs from route 1. The difference between the overflow and the desired traffic, (i.e., $4.32 - 3.43 =$) 0.89 erlangs, which in turn equals 20.6 percent of 4.32, is skipped over route 7 as shown in FIG. 6, whereas the desired 3.43 erlangs is offered to route 7. That is, a call that does not skip over route 7 is offered to route 7. Thus, the desired carried traffic (column 3) on route 7 can be realized (column 6). On the other hand, the upper bound of carried traffic (column 7) on route 7 is determined by offering the entire traffic of $(3.43 + 0.89 =)$ 4.32 erlangs to route 7 to obtain an updated upper bound (570) of $(4.32 \times (1 - 0.603) =)$ 1.72 erlangs (column 7). Note that upper bound of 1.72 erlangs suggests that more traffic can be carried on route 7 than has been assigned to route 7 as an optimal cost mitigating carried traffic. Indeed, during a next iteration of LP 540 more carried traffic may be assigned to route 7. As a result of the skip over, the traffic offered to route 7 is 3.43 erlangs. Offering the traffic in this way will realize the desired carried traffic of 1.36 erlangs (columns 3 and 6). With a route 7 blocking of 0.603 the overflow from route 7 is 2.07 erlangs. And, the overflow traffic of 2.07 erlangs plus the skip traffic of 0.89 erlangs leaves available 2.96 erlangs to be offered to route 5.

Now consider route 5. The desired offered traffic (column 4) to route 5 is 2.64 erlangs, which is less than the sum of the skip and overflow from route 7. The difference between the sum and the desired traffic, (i.e., 2.96−2.64=) 0.32 erlangs, which in turn equals 10.8 percent of the sum 2.96, is skipped over route 5 as shown in FIG. 6, whereas the desired traffic 2.64 erlangs is offered to route 5. Thus the desired carried traffic (column 3) can be realized (column 6). On the other hand, the upper bound of carried traffic (column 7) on route 5 is determined by offering the entire traffic of (2.64+0.32=) 2.96 erlangs to route 5 to obtain an updated upper bound (570) of (2.96×(1−0.287)=) 2.11 erlangs (column 7). Offering the traffic in this way will realize the desired carried traffic of 1.88 erlangs (columns 3 and 6). With a route 5 blocking of 0.287, the overflow from route 5 is 0.76 erlangs. And, the overflow traffic of 0.76 erlangs plus the skip traffic of 0.32 erlangs leaves available 1.08 to be offered to route 4.

Now consider route 4. The desired offered traffic (column 4) to route 4 is 1.94 erlangs, which, unlike the aforedescribed, is greater than the sum of the skip and overflow from route 5, i.e., greater than 1.08 erlangs. Thus the desired carried traffic cannot be realized and LP 540 has provided a solution which is not feasible. Also, following the described process, the updated upper bound (570) for route 4 is (1.08×(1−0.453)=) 0.59 erlangs (column 7) resulting in a violation of 0.47 (i.e., the difference between columns 3 and 7). The process continues until the last route with a nonzero LP desired carried traffic has been dealt with. Thereafter, all unallocated traffic, 0.48 erlangs in our example, is assumed to be available and is offered to all routes which have had zero traffic assigned by LP 540. Thereby, the upper bounds (570) are updated.

After the upper bounds 570 have been updated, LP 540 can be executed again for optimizing the solution. Also, the sum total of violations (column 8) is available as a measure of traffic feasibility. It is not necessary to begin LP 540 from ab initio since the current routing sequences, with upper bounds updated to reflect the new traffic, can be used as a starting basis. The process iterates through the aforedescribed steps until a convergence 550 occurs, i.e., until a feasible, cost mitigated network occurs. Upon convergence, the ordered route numbers (column 1) form a routing sequence (600) of route choices between each pair of originating CSP and terminating CSP and for each predetermined time interval.

Thereafter, subject to point-to-point traffic forecasts and link grade of service constraints, the number of trunks for each link in the network may be engineered (700), for example, through a solution of equation (1) for each link. That is, traffic is offered between pairs of CSPs and may be alternate routed without regard to hierarchy using the aforedescribed cost mitigating routing sequences, which are formed (600) upon convergence (550). With blocking being given, some traffic overflows from a first route choice to a second route choice in the routing sequence. Still more of the traffic may overflow to a third or subsequent route choice. The process continues through route choices in the routing sequence until all the traffic is carried on a route or until there is no alternate route in which case the call is blocked. Thereafter, the process repeats for all pairs of originating and terminating CSPs. Then, inasmuch as the traffic carried on each link $A_{ck}$ and the blocking on each link are known, the number of trunks on each link $N_k$ may be engineered (700) e.g., using equation (1). In addition, engineer network step 700 may identify and append the aforementioned real-time routes, such as routes ⑤ and ⑥ of FIG. 2, to the formed routing sequences 600 for completion of calls that overflow the preplanned (or formed) routing sequence. After the number of trunks $N_k$ on each link k is determined, the network cost $$\sum_k C_k N_k \qquad (6)$$

may be determined for ascertaining if convergence 710 to a cost mitigating network occurs. If the network has so converged, the generated link sizes 810 and/or routing sequences 820 may be extended to network 410. If the network has not so converged, weighted link costs $W_k$ of equation (4) may be updated (720). Thereafter, the link blocking of equation (1) may be updated (730), for example, using the method disclosed in the aforecited Truitt publication. Following thereupon, the process iterates through the aforedescribed steps for mitigating network cost until convergence (710) occurs.

The resultant cost mitigating, routing sequences may thereafter be extended, perhaps being transmitted at predetermined hourly intervals, to the respective CSPs by way of the CCIS system. For example, all the routing sequences for the various intervals of a day may be jointly extended, in advance of the interval of use, to the respective CSPs. The respective CSPs may be suitably programmed to select a sequence according to a prespecified schedule and to perhaps select additional routes on a call-by-call basis subject to a determination of available capacity. Thusly, our dynamic, non-hierarchical alternate routing method also mitigates network cost.

Although our invention has been described and illustrated in detail with respect to a toll telecommunications system for alternate routing a toll telephone call, it is to be understood that the same is not by way of limitation. For example, the principles of our invention apply equally to other networks for routing traffic among a number of points such as routing telephone calls through a metropolitan area or routing of cars over a highway system or routing of natural gas through a pipeline system, etc. Hence, the spirit and scope of our invention is limited only by the terms of the appended claims.

What is claimed is:

1. A method for routing traffic through a network, said network including a plurality of nodes and a plurality of links for interconnecting predetermined nodes according to a predetermined interconnection pattern, a link including one or more servers, said method including a step of alternate routing traffic through said network according to a routing sequence, said sequence including a plurality of route choices between an originating node and a terminating node, and characterized in that said routing method further comprises the step of:

controlling the generation of a plurality of dynamic, cost mitigating, alternate routing sequences responsive to traffic demand and subject to a grade of service constraint, each routing choice in a routing sequence being allowed without regard to network hierarchy.

2. The method defined in claim 1 wherein said alternate route controlling step comprises the steps of
 (a) generating a plurality of route choices between said originating and said terminating nodes,
 (b) assigning a subset of said route choices to a proposed routing sequence,
 (c) responsive to said proposed routing sequence providing a cost mitigating, traffic carrying, feasible routing sequence,
 (d) repeating steps (a) through (c) for each pair of originating and terminating nodes in said network,
 (e) engineering the number of trunks between each pair of originating and terminating nodes in said network,
 (f) determining the cost of said engineered network,
 (g) if said cost is not increasing, storing said cost mitigating routing sequences and repeating steps (a) through (f); otherwise going to step (h), and
 (h) if said cost is increasing, generating a message for extending a last stored cost mitigating routing sequence to said originating node.

3. The method defined in claim 1 further comprising the step of:
 transmitting a selected one of said cost mitigating, routing sequences to said originating node, said selected sequence being time sensitive to traffic demands during a predetermined time interval.

4. The method defined in claim 3 further comprising the steps of:
 generating a first signaling message responsive to said selected routing sequence for identifying a first route choice through said network, and
 transmitting said first route choice identifying signaling message to a first node, said first node being intermediate said originating and said terminating nodes on said first identified route choice.

5. The method defined in claim 4 further comprising the steps of
 generating a first signaling crankback message at said intermediate node responsive to, and for signaling, the unavailability of a link of said first identified route choice and
 transmitting said first crankback message to said originating node.

6. The method defined in claim 4 further comprising the steps of
 generating a second signaling message at said originating node responsive to said selected routing sequence for identifying a second route choice through said network and
 transmitting said second route choice identifying signaling message to a second node, said second node being intermediate said originating and said terminating nodes on said second identified route.

7. The method defined in claim 5 further comprising the steps of
 generating a second signaling message at said originating node responsive to said selected routing sequence for identifying a second route choice through said network and
 transmitting said second route choice identifying signaling message to a second node, said second node being intermediate said originating and said terminating nodes on said second identified route.

* * * * *